May 31, 1955 A. W. NEUMANN 2,709,769

SURROUND-LIGHTING OF PICTURE TUBES

Filed March 30, 1954

INVENTOR.
ADOLF W. NEUMANN
BY Ralph B. Stewart
ATTORNEY

United States Patent Office 2,709,769
Patented May 31, 1955

2,709,769

SURROUND-LIGHTING OF PICTURE TUBES

Adolf W. Neumann, Nurnberg, Germany, assignor to Max Grundig, Fuerth, Germany

Application March 30, 1954, Serial No. 419,849

Claims priority, application Germany June 11, 1953

13 Claims. (Cl. 315—22)

It has been known to illuminate the surround of the picture tube to obtain the impression of an enlargement of the image surface in television tubes. Tubular lamps have been used for this purpose, the lamps being mounted in a translucent frame. The discharge action of these tubular lamps causes disturbances noticeable as flickering of the received picture.

It has been suggested to employ a carrier of luminescent substances as frame rather than the tubular lamps to avoid the disturbances on the picture to be viewed which are caused by the discharge action.

All these devices have the disadvantage that special care has to be taken to simulate or match up the spectral distribution of the illuminated surround to that of the picture tube, so that the picture-enlarging effect can be fully utilized. Otherwise, the spectator's viewing may be impaired.

Consequently, if the picture tube is to be replaced, special care has to be taken to establish conformity between the spectral distributions of the picture tube and the frame. Since the device, according to this invention, is primarily designed for larger sets having larger picture tubes, which are considerably more expensive, difficulties were encountered due to the choice of tubes which was not always satisfactory. Thus, in some cases, the device had to be put out of operation.

These disadvantages are avoided according to this invention by brightening the borders of the picture in the plane of the image screen, said borders serving as the source of light for the surround. Thus, the proper spectral distribution is assured in each tube, because the same source of light, i. e., that which illuminates the picture screen, is employed for the surround and the picture tube.

The nature of the invention will be explained in detail with reference to the drawing.

Figure 1 is a diagram of curves diagrammatically showing the voltage conditions to explain the operation.

Figures 1*a* and 1*b* are details according to Figure 1.

Figure 1:
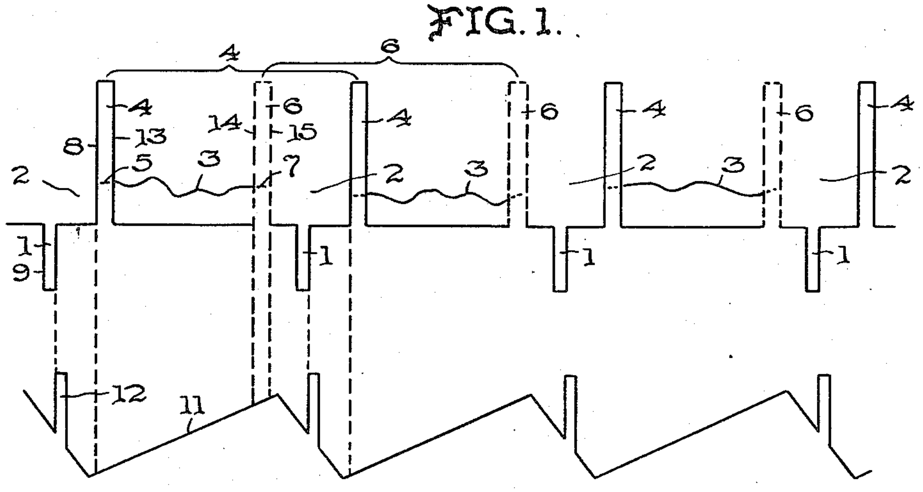
Figure 1A:
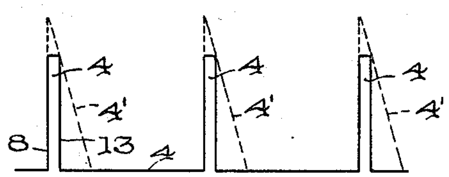
Figure 1B:
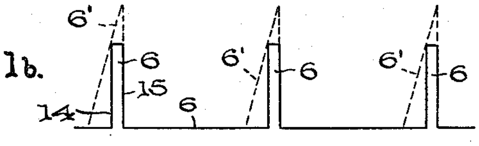

As an example of the operation, horizontal line synchronizing pulses 1 with blanking gaps 2 and picture line modulation 3 are assumed as shown in Figure 1. A rectangular voltage pulse 4 of the form indicated in Figure 1*a* is applied to a control electrode of a Braun tube, so as to illuminate or brighten by scanning to any extent the initial portions 5 of the picture line modulation 3, while the end portions 7 of the picture line modulation 3 are lighted up by means of a phase-displaceable second rectangular voltage pulse 6, shown in Figure 1*b*, derived from the first rectangular voltage pulse 4. It is possible to illuminate or brighten the initial and end portions of the horizontal lines to a greater or lesser extent by displacing the rectangular voltage pulses 4 and 6 with respect to one another. The loss in line length should be 2% at maximum, because the device according to the invention is intended to be mainly applied to larger Braun picture tubes, now being increasingly used. Such loss is more than compensated by the surround-lighting, the width of which may amount to about 10% of the border zone of the entire picture. To obtain an illumination characteristic in which the light intensity in the brightened sections of the line traces increases toward the outer borders of the intial and/or end line portions, a voltage of the pulse shapes indicated by dash-dash lines 4′ and 6′ in Figures 1*a* and 1*b*, respectively, may be applied. The risk of a disturbing excess illumination of the picture proper is greatly reduced, especially if an image screen in the picture tube is used, the back of which is not covered by a metal foil.

In order to assure the synchronization of this edge illuminating voltage pulse 4 with the horizontal line sweep, the leading edge 8 of this pulse may be related to the leading edge 9 of the horizontal line pulse 1, i. e., the horizontal line pulse 1 synchronizes the generator for the illuminating voltage pulse, whereby through suitable time delay means a fixed phase displacement between the horizontal line pulse 1 and the illumination pulse 4 is assured. In such system, the line sweep pulse 11 may fall out of synchronization with respect to the horizontal line pulse 1. This can be avoided by automatic frequency control. Since the illumination or brightening pulse 4, as mentioned in the foregoing, is timed with the horizontal line pulse 1 received from the outside and, therefore, considered as fixed, the saw-tooth shaped sweep voltage 11 may start at an earlier or later instant, so that a varying illumination occurs, resulting in an impaired picture to be viewed. Consequently, the generator for the rectangular voltage pulse should better be synchronized by the sweep pulse indicated at 12, because then the illumination pulse 4 for each line is fixed with respect to the initiating or starting of the horizontal line, so that the same fraction of the horizontal line is always illuminated or brightened. The desired amount of illumination at the initial and end intervals of the horizontal lines can be accomplished in this system by adjusting the distance between the edges 8 and 13 and edges 14 and 15, respectively, that is, by adjusting the width of brightness keying pulses 4 and 6. In addition, the light intensity value may be adjusted by amplitude control of the rectangular voltage pulses. It is advantageous in the latter case to select the intensity value so high with respect to the picture modulation that a constant illumination of the brightened line sections is always assured.

Figures 2, 3:
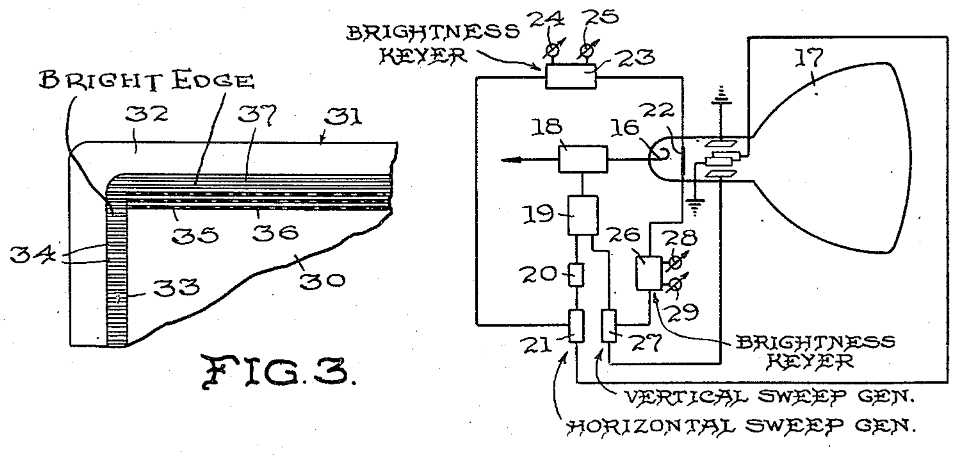
Figure 2 is a block diagram of the new arrangement.
Figure 3 illustrates a fragment of the picture tube with the frame.

In the block diagram of Figure 2, the cathode 16 of a Braun tube 17 is connected to receive a video signal from a video amplifier 18. The composite video voltage is taken off said video amplifier 18 in a known manner and fed to a pulse separating circuit 19. The horizontal line pulses are conducted via the automatic frequency control 20 to the line sweep generator 21, from which the sweep pulses are fed to a brightness keying generator 23 acting on the control grid 22 of the tube 17 and producing brightness keying pulses 4 and 6. An adjustable control 24 of this generator 23 serves to adjust the amplitude of the keying pulses, while the adjustable control 25 is used to adjust the width of the brightness keying pulses. Generator 23 also includes known means for shifting the phase of pulse 6 with respect to pulse 4 and thereby varying the spacing between these pulses. Sweep generator 21 supplies sweep pulses to the horizontal deflection system of the picture tube 17.

A second brightness keying generator 26 is provided to brighten during scanning one or more full lines at the beginning and at the end of a picture frame. This generator 26 may be combined with the brightness keying generator 23, if desired. Said keying generator 26 received its trigger pulses from the picture or frame sweep generator 27 which supplies sweep pulses to the vertical deflection system of tube 17. The operation of this brightness keying system is similar to that described for the initial and end intervals of the horizontal line traces. However, in the present case, a whole line or several lines are lighted or brightened during the scanning of the upper and lower edge portions of a picture frame. Generator 26 is provided with the same adjustable controls as generator 23, and 28 and 29 represent adjustable means which correspond to the adjustable controls 24 and 25 of the brightness keying generator 23. In this case, the brightness keying voltage pulses can be fed to the control grid 22 or to the cathode 16 of the Braun tube 17 or to another control electrode, care being taken to provide the proper polarity of the rectangular voltage pulses. Only one of the two brightness keying steps for the initial and end intervals of the horizontal lines or for the lines at the top and bottom of the picture may be carried out, such operation being advantageously applied in picture tubes with a round image screen.

The operation of the arrangement illustrated in Figure 2 may be summarized as follows:

The incoming signal, including the video signal and the line and frame synchronizing pulses, is amplified at 18. The video signal is applied to the cathode 16 of the picture tube 17 and reproduces the picture on the screen of this tube in the usual manner. The line and frame synchronizing pulses are separated into separate channels by the pulse separator 19, the line pulses being passed through the element 20 and controlling the line sweep wave generator 21, while the frame synchronizing pulses control the frame sweep generator 27. Generator 21 effects horizontal sweeping of the beam of tube 17 at line frequency, and generator 27 effects vertical sweeping of the beam at frame frequency. The two series of pulses 4 and 6 for brightening the beginning and end sections 5 and 7 respectively of the horizontal line traces are produced by generator 23 and are applied to the grid 22, and the pulses for brightening one or more complete line traces at the top and bottom edges of the picture area are produced by generator 26 and are applied to the grid 22. Thus, the brightness keying pulses produced by generator 23 are generated in predetermined timed relation with the operation of the horizontal sweep generator 21, and the brightening pulses produced by generator 26 are generated in predetermined timed relation with the operation of the vertical sweep generator 27.

Figure 3 illustrates diagrammatically in a simplified manner the actions taking place in the picture screen. The image screen 30 of a Braun tube 31 of rectangular shape is surrounded by a frame 32 which may be made of translucent material, such as glass or synthetic material. The inner edge 33 of this frame covers about 1% of the edge zone of the picture tube screen surface 30, so that the illuminated ends 34 of the lines 35 extend approximately to the inner edge 33 of the frame 32. The picture modulation 36, extending over the full extent of line 35, joins the illuminated ends 34. The entire or whole lines 37 are lighted at the beginning and at the end of the picture. As a result of this, the whole frame 32 is uniformly edge-lighted and this surround-lighting can be adjusted by varying the amplitude and/or changing the time characteristic of the brightness keying voltage pulses, as described in the foregoing.

I claim:

1. A picture-receiving system comprising a cathode ray tube having a picture screen and beam deflecting means for deflecting the beam of the tube over said screen in two directions at right angles to each other, a sweep pulse generator for energizing said beam deflecting means to sweep said beam periodically in one direction to produce beam traces on said screen, means controlled in timed relation with the operation of said sweep generator for generating a series of keying pulses each occurring at the beginning of a sweep pulse and a second series of keying pulses each occurring at the end of a sweep pulse, and beam control means energized by said first and second series of keying pulses and providing bright edge-portions along opposite sides of the scanned area of said screen.

2. A picture-receiving system according to claim 1 wherein said sweep generator produces pulses of line frequency and said keying pulses brighten the end portions of the line traces.

3. A picture-receiving system according to claim 1 wherein said sweep generator produces pulses at picture frame frequency and said keying pulses brighten the end portions of each frame sweep.

4. A picture-receiving system according to claim 1 and including means for adjusting the phase relation between said first and said second series of keying pulses.

5. A picture-receiving system according to claim 2 and including means for adjusting the duration of the pulses in said first and said second series of keying pulses.

6. A picture-receiving system according to claim 1 wherein said sweep generator produces line sweep pulses and including a second sweep pulse generator for energizing said beam deflecting means to sweep said beam in the other sweeping direction at frame frequency, means controlled in timed relation with the operation of said frame sweep generator for generating a third series of keying pulses occurring at the beginning of said frame sweep pulses and for generating a fourth series of keying pulses occurring at the end of said frame sweep pulses, the pulses in said third and fourth series of pulses having a duration longer than the duration of a line sweep pulse, and means applying said third and fourth series of pulses to said beam control means to provide bright edge-portions along the remaining two sides of the scanned area of said screen.

7. A picture-receiving system comprising a cathode ray tube having a picture screen and beam deflecting means for deflecting the beam of the tube over said screen in two directions at right angles to each other, a sweep pulse generator for energizing said beam deflecting means to sweep said beam in one direction at line frequency to form line traces on said screen, a second sweep pulse generator for energizing said beam deflecting means to deflect said beam in the other sweeping direction at frame frequency, means controlled in timed relation with the operation of said second sweep generator for generating a first series of keying pulses each occurring at the beginning of a frame sweep pulse and for generating a second series of keying pulses each occurring at the end of a frame sweep pulse, the pulses in said first and second series of pulses having a duration longer than the duration of a line sweep pulse, and beam control means energized by said first and second series of pulses and providing bright edge-portions along opposite sides of the scanned area of said screen.

8. A picture-receiving system according to claim 7 and including means for adjusting the phase relation between said first and said second series of pulses.

9. A picture-receiving system according to claim 8 and including means for adjusting the duration of the pulses in said first and said second series of pulses.

10. A picture-receiving system according to claim 1 and including means controlled by said sweep generator for synchronizing the generator of said two series of keying pulses.

11. A picture-receiving system according to claim 1 and including an open frame of translucent material arranged over said screen and having the inner edge thereof extending over at least a portion of the brightened beam traces.

12. A picture-receiving system according to claim 1 wherein said keying pulses are rectangular in form and have an amplitude which is large with respect to the video signal.

13. A picture-receiving system according to claim 1 wherein said keying pulses are of triangular form, said first series of keying pulses having a steep leading edge and a sloping lagging edge, and said second series of keying pulses having a sloping leading edge and a steep lagging edge.

References Cited in the file of this patent

UNITED STATES PATENTS

| | | |
|---|---|---|
| 2,418,133 | Miller | Apr. 1, 1947 |
| 2,434,264 | Edson | Jan. 13, 1948 |
| 2,604,622 | Hasbrook | July 22, 1952 |
| 2,651,739 | Chudleigh | Sept. 8, 1953 |